Nov. 17, 1953    H. J. GARRETT ET AL    2,659,802
COOKING APPARATUS
Filed Sept. 18, 1950                    2 Sheets-Sheet 2

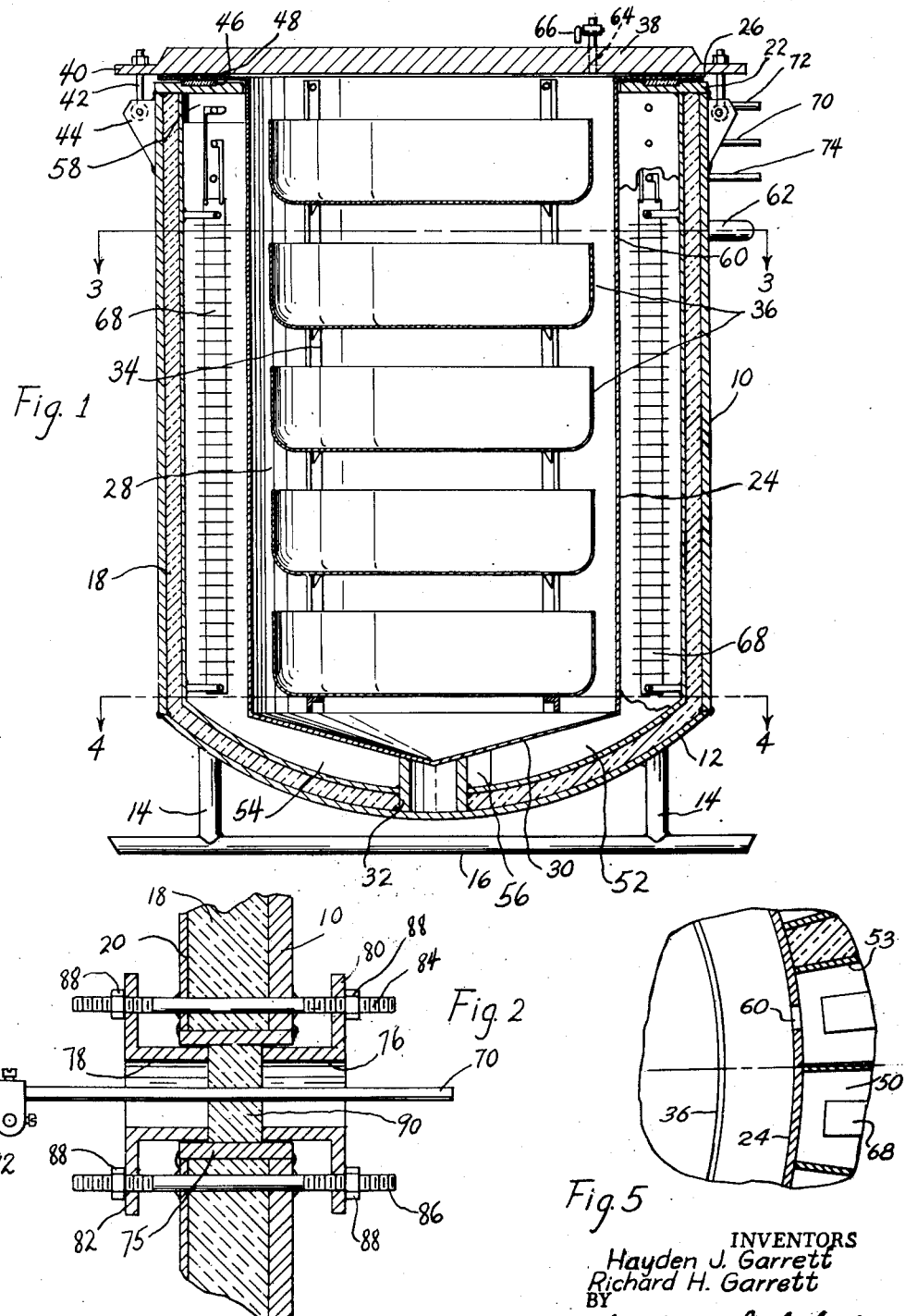

INVENTORS
Hayden J. Garrett
Richard H. Garrett
BY
Charles E. Lightfoot
ATTORNEY

Patented Nov. 17, 1953

2,659,802

UNITED STATES PATENT OFFICE 2,659,802

COOKING APPARATUS

Hayden J. Garrett and Richard H. Garrett, Houston, Tex.

Application September 18, 1950, Serial No. 185,452

2 Claims. (Cl. 219—35)

This invention relates to cooking apparatus, and more particularly to apparatus for the roasting or baking of foods whereby the degree of cooking and the consistency of the cooked product may be accurately controlled.

While not limited to such use, the invention finds particular application in the roasting of meats, whereby the same is completely cooked and tenderized, without exposure to direct contact with the source of heat employed.

In the cooking of meats of various kinds, and especially in the treatment of meat by the process known as barbecuing, the meat is customarily subjected to roasting by an open fire, in order to give the same a desirable browned appearance and to add thereto a pleasing smokey flavor. Numerous variations and refinements have been proposed heretofore, in carrying out the barbecuing process, in attempting to improve the tenderness of the meat and at the same time obtain the precise degree of brownness and flavor desired, but many such processes present the disadvantages of being uncertain in results and requiring constant and careful attention to avoid over or under cooking, and failure to produce uniformly desirable qualities of tenderness, color and flavor in the finished product.

It is an important object of this invention to provide cooking apparatus which is particularly adapted for the roasting and tenderizing of meats, whereby the degree of cooking and the color of the meat may be accurately controlled.

Another object of the invention is the provision of cooking apparatus by which foods may be cooked to any desired degree without direct exposure to an open source of heat.

A further object of the invention is to provide cooking apparatus wherein food is cooked by the circulation of hot air in contact therewith, and in which means is provided for carrying off steam developed in the cooking process while retaining substantially all of the flavoring constituents of the food.

Another object of the invention is the provision of cooking apparatus wherein the food is subjected to radiant heat from a heat source, which also serves to heat air which is circulated under pressure in contact with the food, whereby a substantial saving in the time and fuel expended is accomplished.

A further object of the invention is to provide cooking apparatus having an inner, food-containing chamber surrounded by a heating chamber, wherein heating means is disposed, and in which means is provided for causing the circulation of heated air under pressure about and through the food containing chamber.

The above and other objects and advantages of the invention will become apparent from a consideration of the following detailed description of a preferred embodiment thereof when taken in conjunction with the annexed drawings, wherein—

Figure 1 is a vertical cross sectional view of the invention, taken along the line 1—1 of Figure 3, and showing the interior arrangement and construction of the various parts;

Figure 2 is a fragmentary vertical cross sectional view on an enlarged scale, showing details of structure of the electrical connections to the apparatus;

Figure 3:
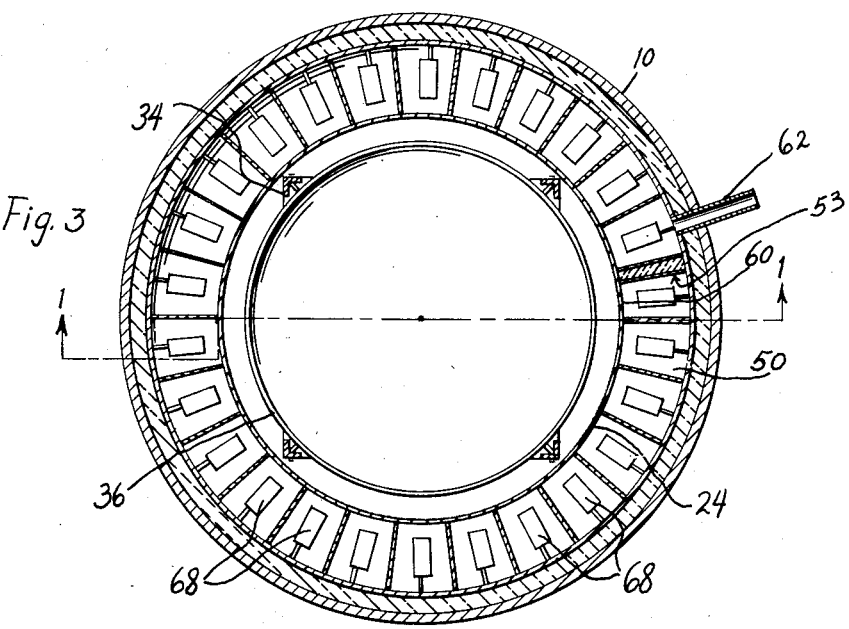
Figure 3 is a horizontal cross-sectional view taken along line 3—3 of Figure 1.
Figure 4:
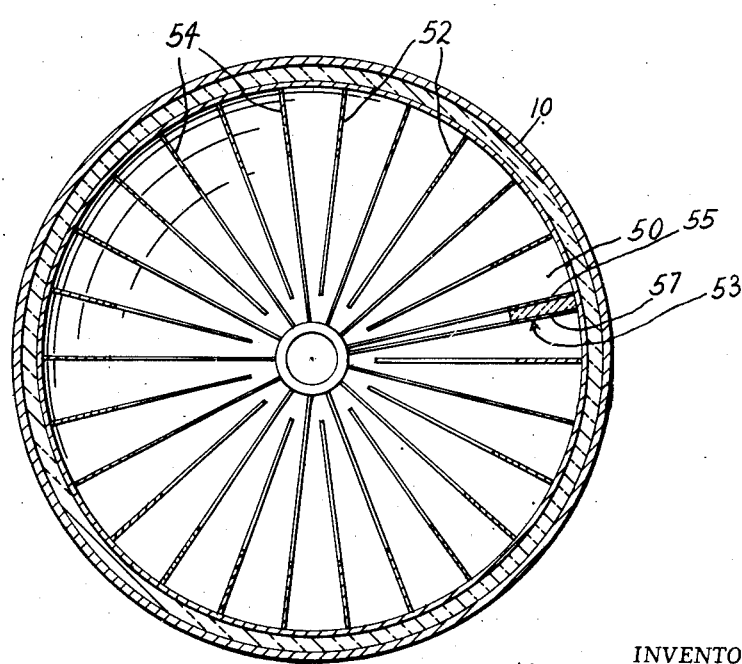
Figure 4 is a horizontal cross-sectional view taken along line 4—4 of Figure 1; and, Figure 5 is a fragmentary cross-sectional view, similar to that of Figure 3, on a somewhat enlarged scale.

Referring now to the drawings in greater detail, in which like numerals of reference indicate similar parts throughout the several views, the numeral 10 indicates an outer casing or shell of suitable material preferably metal and preferably but not necessarily of cylindrical shape having a closed bottom, such as that indicated at 12. The outer casing may be supported in upright position on a suitable supporting structure such as the legs 14, one pair of which is seen in Figure 1, which legs are attached to the outer casing in any desired manner, and at their lower ends may be conveniently welded or otherwise secured to skids, one of which is shown at 16 in Figure 1. The outer casing, in the present illustration, is lined with an insulating material 18, and has an inner lining 20 of suitable material, such as sheet metal. An inwardly projecting flange 22 extends about the top of outer casing 12.

Within the outer casing 12 and spaced inwardly therefrom there is positioned an inner casing or container 24, having an out turned flange 26 about its top, which is supported upon the in turned flange 22 of the outer casing. The inner casing forms a food cooking chamber 28 and may be provided with a closed conical bottom 30 which is conveniently spaced from the bottom 12 of the outer casing by a cylindrical spacer member 32 or the like.

Suitable rack means, such as that indicated at 34 may be provided inside the inner casing or cooking chamber upon which pans 36 or other convenient receptacles are disposed for holding the food to be cooked.

A removable closure 38 is positioned on the outturned flange 26 of the inner casing 24, closing the cooking chamber, which closure has radially extending slotted lugs 40 for the reception of fastenings 42 pivotally carried by brackets 44 secured to the outside of the outer casing, and by which the closure is secured in place. Suitable packing 46 is provided forming a seal between the outturned flange 26 and closure 38 and similar packing 48 forms a seal between the outturned flange 26 and the outturned flange 22 of the outer casing.

The space between the inner and outer casings constitutes a heating chamber 50, extending about and beneath the bottom of the cooking chamber, and in this heating chamber there are a plurality of baffles 52 and 54 preferably disposed radially therein. The baffles 52 are arranged alternately with the baffles 54. All of the baffles extend entirely across the heat-chamber from the outer casing to the inner casing, the baffles 52 extending from the inturned flange 22 and terminating short of the spacer member 32 to provide openings 56 beneath the bottom of the inner casing, while the baffles 54 extend from the spacer member 32 and terminate short of the flange 22 to provide openings 58 at the upper end of the heating chamber, as will be seen in Figure 1 of the drawings.

There is an inlet opening in the inner casing leading from the heating chamber into the cooking chamber 28, and an inlet pipe 62, leading through the outer casing into the heating chamber. An opening 64 is also provided in the closure 38 leading from the cooking chamber 28. The inlet pipe 62 may be connected with a suitable source of fluid such as air or other gas under pressure to supply the same to the apparatus under the control of valve mechanism not shown.

A master baffle 53 is positioned in the heating chamber between the inlet opening 60 of the inner casing and the inlet pipe 62 of the outer casing 10, and extending completely across the heating chamber and from top to bottom thereof. This master baffle 53 may conveniently take the form of spaced sheets 55 and 57 between which any suitable insulating material may be disposed.

By this arrangement fluid under pressure may be passed into the heating chamber 50 through inlet pipe 62, and flows through a tortuous passage therein flowing upwardly and downwardly, alternately about the baffles 52 and 54, through the openings 56 and 58 at the bottom and top, respectively, of the heating chamber and thence through opening 60 into the cooking chamber. From the cooking chamber the fluid under pressure is released from the cooking chamber through the outlet 64 in closure 38, which outlet is controlled by suitable valve means such as that indicated at 66. Thus, the flow of fluid through the heating and cooking chambers and the pressure maintained in the apparatus is completely controlled and regulated at all times, and the fluid flows through a continuous tortuous passage in the heating chamber and into the cooking chamber.

Located between the baffles in the heating chamber there are the heating elements 68, which may be of the electrical resistance type, and suitably supported in any convenient manner. These heating elements are preferably, but not necessarily enclosed, and may be spaced from the baffles and the casings to permit the free passage of air around the elements in order to effectively heat the air and also heat the inner casing and the cooking chamber by radiation.

The heating elements 68, may be connected to a source of electrical current in any approved manner and controlled by conventional electrical controls, not shown. For example, the heating elements may be connected by a conventional three-conductor system, whereby all or a portion of the elements may be used at one time. Thus, a central conductor 70 may be connected to all of the elements, and an upper conductor 72 connected to every other one of the elements, while a lower conductor 74 is connected to the remaining elements.

The conductors 70, 72 and 74 may be passed through the outer casing in the manner shown in Figure 2, wherein a cylindrical or tubular member 75 is fitted into an opening in the outer casing and welded thereto, and opposed cylindrical members 76 and 78 are inserted in the section.

The members 76 and 78 are each provided with an outstanding flange, as 80 and 82 respectively, which flanges are perforated for the reception of threaded rods, such as those indicated at 84 and 86, passing through the outer casing and welded or otherwise secured thereto. Nuts 88, or the like, on the rods 84 and 86 secure the flanges 80, 82 on the rods and permit adjustment of the members 76, 78 toward or away from each other.

A conductor, as 70, passes centrally through the members 76, 78, and also through a body of electrical and heat insulating material 90 between the opposed ends of the members, and which fits snugly in the section 75 and is compressed therein by the members 76, 78. Thus the members 76, 78 may be tightened by the nuts 88 to securely seal the opening in the outer casing and prevent leakage therethrough or around the conductors. Adjacent their inner ends, the conductors may be provided with suitable connectors, as 92, for making connection with the heating elements.

In the use of the above described cooking apparatus, the pans or receptacles 36 are loaded with meat and placed in the cooking chamber, and the cover 38 clamped in closed position. Air under suitable pressure is then admitted through the inlet pipe 62 and flows upwardly and downwardly about the baffles 52, 54 through the heating chamber 50 and into the cooking chamber 28 through the opening 60, whence the air may pass out through the outlet pipe 64 and valve 66 on the cover 38. The heating elements 68 may then be set in operation to heat the air and also to heat the cooking chamber by radiation.

Steam formed during the cooking process in the chamber 28 will be carried off through the outlet pipe 64, and the flow of heated air through the heating chamber and cooking chamber as well as the pressure within the apparatus can be closely regulated to secure the proper degree of tenderizing and browning of the meat, as may be desired.

It will thus be seen that the invention provides cooking apparatus of simple design, which is economical in use and which makes possible the control of the cooking process to a high degree.

While the invention has been disclosed in connection with a particular embodiment, it will be understood that the same is intended by way of illustration only, and numerous changes can be made in the structure and arrangement of the various parts, without departing from the spirit of the invention or the scope of the appended claims.

Having thus clearly shown and described the invention, what is claimed as new and desired to secure by Letters Patent is:

1. In cooking apparatus an outer casing, an inner casing forming a cooking chamber and spaced from the outer casing to form therewith a heating chamber surrounding the cooking chamber, said outer casing having an inlet communicating with a source of fluid under pressure and leading into the heating chamber, said inner casing having an opening communicating with the heating chamber and with the cooking chamber and said cooking chamber having an outlet opening outwardly of the outer casing, baffles extending across the heating chamber from the inner surface of the outer casing to the outer surface of the inner casing and forming vertical compartments in the heating chamber, each of the baffles having one end spaced from one end of the heating chamber, said compartments being in communication beyond said ends of the baffles and forming a continuous passageway from the inlet to said opening, and heating means in each of the compartments.

2. In cooking apparatus an outer casing, an inner casing forming a cooking chamber and spaced from the outer casing to form therewith a heating chamber surrounding the cooking chamber, said outer casing having an inlet communicating with a source of fluid under pressure and with the heating chamber and said inner casing having an opening remote from the inlet and communicating with the heating chamber and the cooking chamber, said cooking chamber having an outlet opening outwardly of the outer casing, baffles in the heating chamber extending radially from the inner surface of the outer casing to the outer surface of the inner casing and forming a continuous passageway in the heating chamber from the inlet to said opening, and a plurality of electrical heating units in the heating chamber in spaced radial relation to the cooking chamber.

HAYDEN J. GARRETT.
RICHARD H. GARRETT.

References Cited in the file of this patent

UNITED STATES PATENTS

| Number | Name | Date |
|---|---|---|
| 600,362 | Fehn | Mar. 8, 1898 |
| 1,192,802 | Trescott | July 25, 1916 |
| 1,527,771 | Baer et al. | Feb. 24, 1925 |
| 1,694,378 | Goodwin | Dec. 11, 1928 |
| 1,927,937 | Houck | Sept. 26, 1933 |
| 2,305,056 | Austin | Dec. 15, 1942 |
| 2,328,210 | Groen | Aug. 31, 1943 |
| 2,494,022 | Weintrob et al. | Jan. 10, 1950 |

FOREIGN PATENTS

| Number | Country | Date |
|---|---|---|
| 3,855 | Great Britain | of 1898 |
| 36,353 | Sweden | Mar. 11, 1914 |
| 118,661 | Sweden | Apr. 22, 1947 |
| 572,275 | France | Feb. 18, 1924 |